United States Patent [19]
Jäger

[11] Patent Number: 5,453,501
[45] Date of Patent: Sep. 26, 1995

[54] PHTHALOCYANINE REACTIVE DYESTUFFS

[75] Inventor: Horst Jäger, Leverkusen, Germany

[73] Assignee: Bayer Aktiengesellschaft, Leverkusen, Germany

[21] Appl. No.: 222,355

[22] Filed: Apr. 4, 1994

Related U.S. Application Data

[63] Continuation of Ser. No. 99,899, Jul. 30, 1993, abandoned.

[30] Foreign Application Priority Data

Aug. 6, 1992 [DE] Germany ............ 42 26 045.0

[51] Int. Cl.$^6$ .................................. C09B 47/24
[52] U.S. Cl. .................. 540/126; 540/123; 8/661
[58] Field of Search ........................ 540/126

[56] References Cited

U.S. PATENT DOCUMENTS

| | | | |
|---|---|---|---|
| 4,330,469 | 5/1982 | Gati et al. | 540/126 |
| 4,396,549 | 8/1983 | Nakamatsu et al. | 540/126 |
| 4,505,714 | 3/1985 | Omura et al. | 8/549 |
| 4,992,589 | 2/1991 | Fuchs et al. | 564/440 |
| 5,003,053 | 3/1991 | Springer et al. | 534/638 |

FOREIGN PATENT DOCUMENTS

| | | | |
|---|---|---|---|
| 0073267 | 3/1983 | European Pat. Off. . | |
| 197418 | 3/1986 | European Pat. Off. . | |
| 891121 | 9/1953 | Germany . | |
| 1156908 | 1/1960 | Germany | 540/126 |
| 3405204 | 8/1984 | Germany . | |
| 1118785 | 7/1968 | United Kingdom . | |

OTHER PUBLICATIONS

Derwent abstract, Textiles: Paper: Cellulose, p. 5, week D47, J5 6128–375 1981.

Derwent abstract, Textiles: Paper: Cellulose, p. 14, week 8648, J6 1233–063–A 1985.

Derwent abstract, Textiles: Paper: Cellulos, p. 2, week C32, J5 5082–164. 1978.

Food: Disinfectants: Detergents, p. 6, week 8546, J6 0194–028–A 1984.

Patent Abstracts of Japan, Feb. 6, 1985, C field; "Phthalocyanine compound and dyeing or textile printing using the same", 59–174653 (A), Oct. 3, 1984, Sumitomo Kagaku Kogyo KK, Takashi Omura; vol. 9, No. 28 (C–264), p. 143.

Primary Examiner—Mukund J. Shah
Assistant Examiner—Pavanaram K. Sripada
Attorney, Agent, or Firm—Sprung Horn Kramer & Woods

[57] ABSTRACT

Phthalocyanine reactive dyestuffs which, in the form of the free acid, have the formula (1)

$$[Pc] \underset{}{\underbrace{\begin{pmatrix} (SO_3H)_a \\ (SO_2N\!\!<\!\!\begin{smallmatrix}R^1\\R^2\end{smallmatrix})_b \\ \left( SO_2N\!\!-\!\!B\!\!-\!\!N\!\!\underset{R^9}{\underset{|}{\phantom{X}}}\!\!\begin{smallmatrix}\\ \end{smallmatrix}\!\!\underset{X}{\overset{N}{\diagdown}}\!\!\underset{}{\overset{N}{\diagup}}\!\!NH\!\!-\!\!\!\begin{smallmatrix}\\ \end{smallmatrix}\!\!-\!\!A \right)_c \end{pmatrix}}}$$

in which the variable radicals have the meaning given in the description, are prepared by condensation of the corresponding amines with cyanuric fluoride or cyanuric chloride in any desired order.

The reactive dyestuffs according to the invention exhibit good wet and light fastness properties and are used for the dyeing and printing of cotton.

10 Claims, No Drawings

PHTHALOCYANINE REACTIVE DYESTUFFS

This application is a continuation of application Ser. No. 08/099,899, filed Jul. 30, 1993, now abandoned.

Phthalocyanine reaction dyestuffs are known from JP-A-56 128 375 and JP-A-56 123 483 (≙U.S. Pat. No. 4,396,549).

The present invention relates to novel phthalocyanine reactive dyestuffs which, in the form of the free acid, have the formula (1),

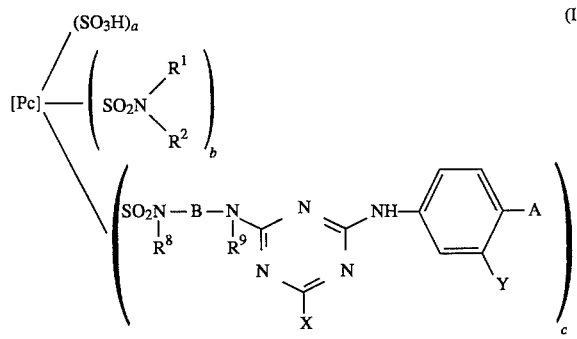

in which

Pc denotes a metal-free or metal-containing phthalocyanine, $R^1$, $R^2$, independently of one another, may represent hydrogen or substituted or unsubstituted $C_1$–$C_6$-alkyl or together with the nitrogen atom which they include form a heterocyclic radical which, if desired, may contain further heteroatoms, B denotes a divalent aliphatic, cycloaliphatic aromatic or araliphatic radical, X represents chlorine or fluorine, Y represents $SO_2CH=CH_2$ or $SO_2CH_2CH_2Z$, in which Z denotes a substituent which can be eliminated by alkali, A denotes a group of the formula

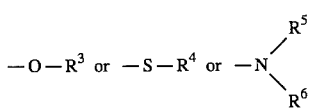

in which $R^3$ represents a substituted aliphatic radical, $R^4$ represents an aliphatic or aromatic radical and $R^5$ represents hydrogen, an aliphatic, cycloaliphatic or araliphatic radical and $R^6$ represents $R^5$ or an aromatic radical or the radicals $R^5$ and $R^6$, possibly with the inclusion of a further heteroatom, can form a ring, a is 0 to 3 b is 0 to 3 c is 1 to 3 a+b+c being 3 to , $R^8$, $R^9$, independently of one another, represent hydrogen or substituted or unsubstituted $C_1$–$C_6$-alkyl.

In a preferred embodiment, $R^1$, $R^2$, $R^8$ and $R^9$, independently of one another, represent unsubstituted or $OCH_3$-, OH-, COOH-, $SO_3H$- or phenyl-substituted $C_1$–$C_4$-alkyl, for example methyl, ethyl, isopropyl, propyl, n-butyl, isobutyl, sec.-butyl, tert.-butyl, β-hydroxyethyl, β-sulphatoethyl or β-methoxyethyl.

Y represents, for example, $SO_2CH_2CH_2OSO_3H$, $SO_2CH_2CH_2Cl$, $SO_2CH_2CH_2S_2O_3H$, $SO_2CH_2CH_2OPO_3H_2$

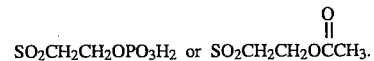

In a preferred embodiment, $R^5$ and $R^6$, independently of one another, represent the radical of an aliphatically substituted amine or of a heterocyclic amine in which $R^5$ and $R^6$ together with the joint N atom form a ring.

Heteroatoms for the ring formation of $R^5$ and $R^6$ are preferably O, NH, $NCH_3$, $NCOCH_3$, N—$C_2H_4SO_2CH=CH_2$, S, SO or $SO_2$.

Aliphatic radicals as $R^3$, $R^4$, $R^5$ and $R^6$ are preferably $C_1$–$C_6$-alkyl radicals, in particular those which, if desired, are interrupted by heteroatoms and/or, if desired, are substituted.

Examples of interrupting heteroatoms are: O, S, $SO_2$, $NR^7$, $NR^7CO$, $NR^7SO_2$, $R^7$ representing hydrogen or $C_1$–$C_4$-alkyl.

Examples of substituents of the aliphatic radicals $R^3$, $R^4$, $R^5$ and $R^6$ include: OH, Cl, F, COOH, $SO_3H$, $OSO_3H$, $SO_2CH=CH_2$, CN, $OCH_3$, $SO_2CH_2CH_2Cl$, $SO_2CH_2CH_2OSO_3H$, $NR^7$—W, W representing a heterocyclic reactive group, in particular one from the series of the monochloro- and monofluorotriazine series or of the fluoropyrimidine series.

The cycloaliphatic radicals $R^5$ are in particular 5- or 6-membered cycloalkyl radicals.

The araliphatic radicals $R^5$ are in particular those of the formula

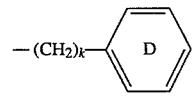

in which k is 1 to 4 and the ring D can be substituted, for example, by Cl, $NO_2$, COOH, $SO_3H$, $CH_3$, $OCH_3$, $SO_2CH_2CH_2OSO_3H$, $SO_2CH=CH_2$ or $CH_2SO_2CH_2CH_2OSO_3H$.

Aromatic radicals $R^4$ and $R^6$ are in particular phenyl or naphthyl radicals which are unsubstituted or substituted, in particular by $OCH_3$, $OC_2H_5$, $OCH_2CH_2OH$, $CH_3$, $C_2H_5$, -$CH(CH_3)_2$, F, Cl, Br, COOH, $SO_3H$, $NO_2$, $SO_2CH_2CH_2OSO_3H$, $SO_2CH=CH_2$, $CH_2SO_2CH_2CH_2OSO_3H$, $CH_2SO_2CH=CH_2$.

Examples of aliphatic radicals as $R^5$ and $R^6$ include:

$CH_3$, $C_2H_5$, $CH_2CH_2OH$, $CH_2CH_2OCH_3$, $CH_2CH_2OC_2H_5$ $CH_2CH_2OCH_2OSO_3H$, $CH_2SO_3H$, $CH_2CH_2SO_3H$, $CH_2CH_2OSO_3H$, $CH_2COOH$, $CH_2CH_2COOH$, $CH_2CH_2SO_2CH_2CH_2OSO_3H$, $CH_2CH_2OCH_2CH_2SO_2CH_2CH_2Cl$, $CH_2CH_2OCH_2CH_2SO_2CH=CH_2$, $CH_2CH_2NHCOCH_2CH_2COOH$, $CH_2CH_2CH_2SO_2CH_2CH_2OSO_3$, $CH_2CH_2CH_2SO_2CH=CH_2$, $CH_2CH_2CH_2SO_2CH_2CH_2Cl$,

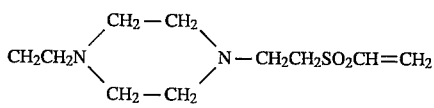

Examples of aliphatic radicals as $R^4$ are the COOH-, $OCH_3$-, $SO_3H$- or $OSO_3H$-substituted radicals mentioned for $R^5$ and $R^6$.

Examples of the radical B are as follows:

a) aliphatic or cycloaliphatic

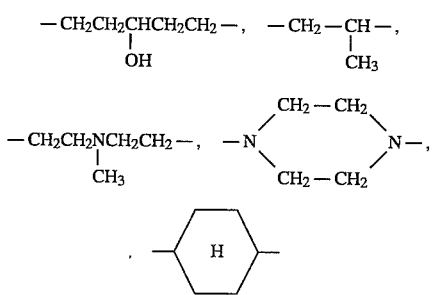

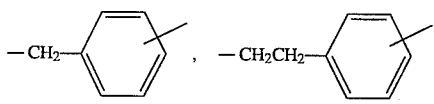

b) araliphatic

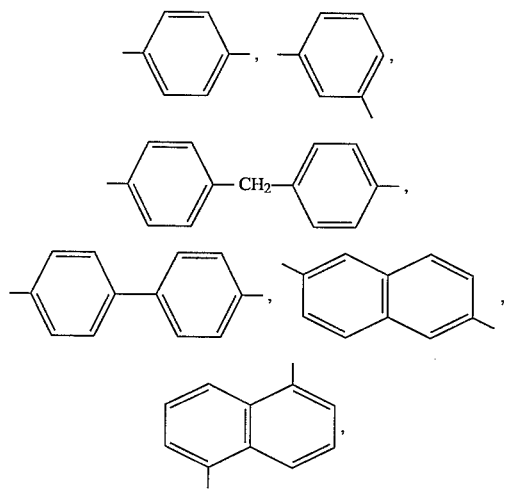

c) aromatic

The phenylene or naphthylene rings can of course contain substituents, for example $C_1$–$C_4$-alkyl, such as $CH_3$, $C_2H_5$, $C_1$–$C_4$-alkoxy, such as $OCH_3$, $OC_2H_5$, halogen, such as Cl or Br, or acid groups, such as $SO_3H$, COOH.

The phthalocyanine radical Pc can be metal-free but is preferably metal-containing. Suitable metals are cobalt, nickel and copper, copper being preferred.

In the dyestuffs of the formula (1), each benzene ring of the phthalocyanine radical preferably carries not more than one, of the substituents indexed by a, b or c, the substituents being preferably bound only to the 3 or only to the 4 position.

Within the formula (1), those compounds are preferred in which $R^1$, $R^2$, $R^8$ and $R^9$ denote hydrogen, furthermore those in which B represents

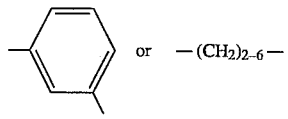    or    $-(CH_2)_{2-6}-$

A represents

in particular

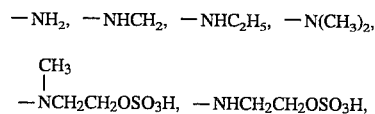

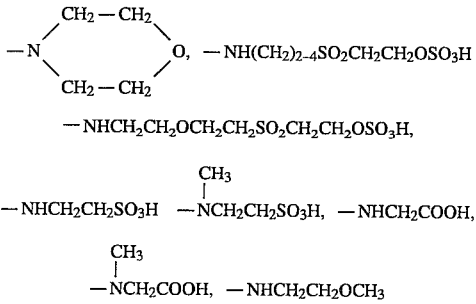

and X denotes chlorine.

Further preference is given to those in which a is 1 to 2 b is 0 to 1 c is 1 to 3, in particular 1.5 to 2.5, the sum of a, b and c being at most 4.

Further preference is given to those compounds in which B represents

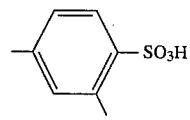

A has the preferred meaning given and X represents fluorine.

The invention furthermore relates to processes for the preparation of the compounds of the formula (1), which are characterised in that phthalocyaninesulphonyl chloride of the formula

in which Pc has the meaning given, m represents a number of from 0 to 3, n represents a number of from 1 to 4, and the sum of m and n is at most 4, is condensed with a diamine of the formula

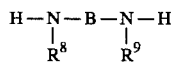 (3)

in which $R^8$, $R^9$ and B have the meaning given, if appropriate in the presence of an amine of the formula

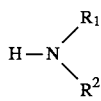 (4)

in which $R^1$ and $R^2$ have the meaning given, to give a compound of the formula

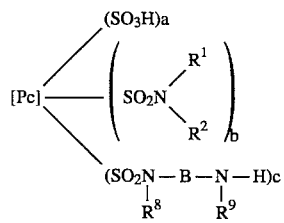 (5)

Compounds of the formula (5) are also obtained by condensing Phthalocyaninesulphonyl chlorides (2) with amines of the formula (6)

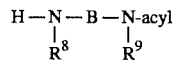 (6)

in which $R^8$, $R^9$ and B have the meaning given, and acyl represents an acyl radical, in particular represents acetyl, formyl, oxalyl, methoxycarbonyl or ethoxycarbonyl, if appropriate in the presence of an amine of the formula (4), to give a compound of the formula

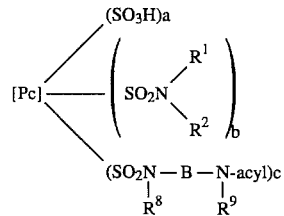 (7)

followed by hydrolysis of this compound by heating in acidic or alkaline medium to give a compound of the formula (5).

The amino-containing phthalocyanine of the formula (5) and the amine of the formula

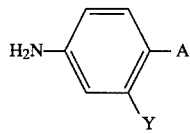 (8)

in which A and Y have the meaning given, are then reacted with cyanuric chloride or cyanuric fluoride in any desired order.

Examples of the starting compounds of the formula (2) which are used are sulphonyl chlorides or sulpho-containing sulphonyl chlorides of the metal-free phthalocyanine, but preferably those of metal-containing phthalocyanines.

Preparation of the phthalocyaninesulphonyl chloride-sulphonic acids of the formula (2) is carried out in a known manner by treatment of copper phthalocyanine or nickel phthalocyanine or sulphonic acids thereof with chlorosulphonic acid at 100° C. to 145° C., temperatures of between 110° C. and 138° C. being preferred. The ratio of the sulphonyl chloride groups and the sulphonic acid groups can be varied by varying the amount of chlorosulphonic acid. In addition, the m/n ratio can be varied by after-treatment of the chlorosulphonic acid melt with a suitable amount of thionyl chloride, phosphorus oxychloride or phosphorus pentachloride preferably at temperatures of between 70° C. and 95° C. (German Patent Specification DE 891121).

Depending on the type of preparation chosen, the sulpho groups in the phthalocyanine molecule are in the 4 and/or in the 3 position, depending upon whether they are prepared starting with 4-sulphophthalic acid or a mixture of 4- and 3-sulphophthalic acid or whether they are prepared by sulphonation or by direct sulphochlorination of the unsubstituted phthalocyanine, all four sulpho or sulphonyl chloride groups, in the last-mentioned case, being preferably bound to the 3 position.

The amines of the formula (3) or (6) are used in a molar excess of 0 to 70%, relative to the phthalocyaninesulphonyl chloride of the formula (2), this amount being in excess of the molar amounts given by the particular numerical value of index c (see formula 1).

Reaction of the compounds of the formula (2) with amines (3) or (6) and, if desired, (4) is preferably carried out in aqueous, or else in aqueous-organic medium in a pH range from 4 to 11 and at temperatures of between 0° C. and 60° C., the liberated acid being advantageously neutralised or buffered by addition of alkali, such as, for example sodium bicarbonate, sodium carbonate, sodium hydroxide, sodium acetate, lithium acetate, lithium hydroxide or potassium carbonate or, if desired, the liberated acid being bound by an excess of amine (4). Examples of suitable organic solvents are aliphatic alcohols, such as methanol or ethanol, halogenated aromatics, such as chlorobenzene or dichlorobenzene, or dimethylformamide and the like.

The condensation can also be carried out in the presence of a reaction accelerator, such as pyridine, pyridinecarboxylic acid or pyridinesulphonic acid. Amines (3) or (6) and, if used, (4) can be reacted with compounds (2) simultaneously or in succession in any desired order. If the phthalocyaninesulphonyl chloride (2) contains fewer sulpho groups than is desired for compound (1), the sulphonyl chloride groups which have not reacted with amines (3) or (6) and, if present, (4) are hydrolysed to sulpho groups.

Hydrolysis of the compounds of the formula (7) to the compounds (5) is carried out by heating at 70° to 100° C., in particular 80° to 90° C., in 1- to 2-normal acid or base for one to four hours. Preferably, hydrochloric acid or sodium hydroxide is used.

Condensation of amines (5) and (8) with cyanuric chloride or cyanuric fluoride is preferably carried out in aqueous medium, a temperature of −5° to 20° C. being chosen for the first condensation step and a temperature of 0° C. to 70° C. for the second condensation step. Acylation with cyanuric fluoride is carried out at low temperatures than with cyanuric chloride. The pH range in the individual acylation steps is between 2 and 9, in particular between 5 and 6.

The dyestuffs of the general formula (1) are usually formed in the synthesis in the form of mixtures of the individual dyestuffs which differ from one another by the degrees of substitution a, b and c, which is the reason why the list of formulae covering the dyestuffs according to the invention shows fractional values for indices a, b and c. These fractional numbers are average values which can be determined experimentally and analytically.

Examples of diamines of the formula (3) are:

m-phenylenediamine, 1-methoxy-2,4-diaminobenzene, 1-chloro-2,4-diaminobenzene, 1-methyl-2,4-diaminobenzene, 1-sulpho-2,4-diaminobenzene, 1-carboxy-2,4-diaminobenzene, p-phenylenediamine, 1-sulpho-2,5-diaminobenzene, 1-carboxy-2,5-diaminobenzene, 1-N-methylaminomethyl-4-amino-benzene, 1-(β-aminoethyl)-4-aminobenzene, 4,4-diaminodiphenyl-2-sulphonic acid, ethylenediamine, N-methylethylenediamine, N,N'-dimethyl-ethylenediamine, N,N'-diethylethylenediamine, propylenediamine, N-methylpropylenediamine, N,N'-dimethylpropylenediamine, butylenediamine, pentylenediamine and hexylenediamine, piperazine, N-β-hydroxyethyl-ethylenediamine.

Examples of amines of the formula (6) are:

monoacetylethylenediamine monoacetylpropylenediamine monoacetylbutylenediamine monoacetylhexamethylenediamine monoacetylpiperazine 2-aminoformanilide, 3-aminoacetanilide, 3-aminophenyloxyamic acid, 4-aminoformanilide, 4-aminoacetanilide, 2-aminoacetanilide, 4-amino-(acetylmethyl)-aniline, 4-aminophenyloxyamic acid, 2,5-dichloro-4-aminoacetanilide, 4-amino-2-formylaminotoluene, 4-amino-2-acetylaminotoluene, 2-amino-4-acetylaminotoluene, 2-amino-4-(acetylethylamino)-toluene, [(3-amino-4-methylphenyl)amino]-oxoacetic acid, (4-amino-4-biphenyl)-oxamic acid, 2-amino-4-acetylaminobenzoic acid, 2-amino-5-acetylaminobenzoic acid, 3-amino-5-acetylaminobenzoic acid, 4-amino-4-acetylaminobiphenyl-2-sulphonic acid, 2-sulpho-4-aminophenyl-oxamic acid and (5-sulpho-3-amino-2-methylphenyl)-oxamic acid.

Examples of amines of the formula (4) are:

ammonia, methylamine, ethylamine, n-propylamine, ethanolamine, diethanolamine, taurine, N-methyltaurine, morpholine.

Examples of compounds of the general formula (8) which serve for the synthesis of the compounds according to the invention are:

4-dimethylamino-3-(β-sulphatoethylsulphonyl)-aniline, 4-ethylamino-3-(β-sulphatoethylsulphonyl)-aniline, 4-(N-morpholino)-3-(β-sulphatoethylsulphonyl)-aniline, 4-N-(β-sulphatoethyl)-amino-3-(β-sulphatoethylsulphonyl)aniline, 4-[N-methyl-N-(β-sulphatoethyl)]-amino-3-(β-sulphatoethylsulphonyl)-aniline, 4-N-(β-sulphoethyl)-amino- 3-(β-sulphatoethylsulphonyl)-aniline, 4-[N-methyl-N-(β-sulphoethyl)]-amino-3-(β-sulphatoethylsulphonyl)-aniline, 4-N-(carboxymethyl)-amino-3-(β-sulphatoethylsulphonyl)-aniline, 4-N-[β-(4-sulphophenyl)-ethyl]-amino- 3-(β-sulphatoethylsulphonyl)-aniline, 4-methylamino-3-(β-sulphatoethylsulphonyl)aniline, 4-N-(-sulphato-n-propyl)-amino-3-(β-sulphatoethylsulphonyl)-aniline, 4-N-[β-(β'-sulphato-ethoxy)ethyl]-amino-3-(β-sulphatoethylsulphonyl)-aniline, 4-[N-methyl-N-(-sulphato-n-propyl)]-amino-3-(β-sulphatoethylsulphonyl)-aniline, 4-[(β-sulphatoethyl)-thio]-3-(β-sulphatoethylsulphonyl)-aniline, 3-(β-sulphatoethylsulphonyl)-1,4-diaminobenzene, 4-N-(β-sulphatoethyl)-amino- 3-(β-thiosulphatoethylsulphonyl)-aniline, 4-N-(β-phosphatoethyl)-amino-3-(β-sulphatoethylsulphonyl)-aniline, 4-N-(β-sulphato-n-propyl)-amino-3-(β-sulphatoethylsulphonyl)-aniline, 4-N-(β-sulphato-n-propyl)-amino- 3-(β-sulphatoethylsulphonyl)-aniline, 4-N-(β, -disulphato-n-propyl)-amino-3-(β-sulphatoethylsulphonyl)-aniline, 4-N-(β-carboxyethyl)-amino-3-(β-sulphatoethylsulphonyl)aniline, 4-N-[β-(β'-sulphatoethylamino)-ethyl]-amino-3-(β-sulphatoethylsulphonyl)-aniline, 4-N-[β-[N'-methyl-N'-(β-sulphatoethyl)-amino]-3-(β-sulphatoethylsulphonyl)-aniline, 4-N-[(β-sulphato-α-methyl)ethyl]-amino- 3-(β-sulphatoethylsulphonyl)-aniline, 4-diethylamino-3-(β-sulphatoethylsulphonyl)-aniline, 4-N-{β-[4'-(β'-sulphatoethylsulphonyl)-phenyl]-ethyl}-amino-3-(β-sulphatoethylsulphonyl)-aniline, 4-β-sulphatoethoxy- 3-(β-sulphatoethylsulphonyl)-aniline, 4-[β-(β'-sulphatoethoxy)-ethoxy-3-(β-sulphatoethylsulphonyl)-aniline, 4-amino-3-(β-sulphatoethylsulphonyl)aniline.

The starting compounds of the general formula (8) can be prepared analogously to known procedures from the corresponding amino compounds of the general formula (8a)

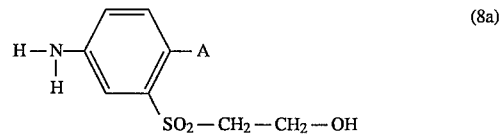

in which A has the abovementioned meaning, for example by reaction with customary sulphating or phosphating agents in order to esterify them to give the corresponding β-sutphatoethylsulphonyl or β-phosphatoethylsulphonyl derivatives.

The β-sulphatoethylsulphonyl compound of the general formula (8) can then be converted into its vinylsulphonyl compound in a procedure known per se and this compound can in turn be converted into its β-thiosulphatoethylsulphonyl compound. Compounds of the general formulae (8) and (8a) are disclosed, for example, by EP-A-0,153,559, EP-A-0,171,611 and EP-A-0,197,418 and can be prepared analogously to the details given there.

Isolation of the phthalocyaninedyestuffs obtained by the processes described above takes place in the usual manner by salting out, for example with sodium chloride or potassium chloride, or by evaporation of the neutral aqueous dyestuff solution, preferably at moderately elevated temperature and reduced pressure or by spraydrying.

The reactive dyestuffs of the formula (1) produce dyeings having good wet and light fastness properties. It may be mentioned in particular that the dyestuffs have good solubility and electrolyte solubility while exhibiting good exhaust properties and high fixation of the dyestuff and that the non-fixed portions can be easily removed.

The novel dyestuffs of the formula (1) are suitable for the dyeing and printing of hydroxyl- or amido-containing materials, such as textile fibre, filaments and fabrics made of wool, silk, synthetic polyamide and polyurethane fibres and for the washfast dyeing and printing of native or regenerated cellulose, the treatment of cellulose materials advantageously being carried out in the presence of acid-binding agents and, if desired, by application of heat by the methods known for reactive dyestuffs.

The formulae given are those of the corresponding free acids. In general, the dyestuffs are isolated and used for dyeing in the form of alkali metal salts, in particular of sodium salts.

The weights given in the examples relate to the free acid. The colour indicator numbers given in the examples refer to the Colour Index hue indication chart.

EXAMPLE 1

0.1 mol of water-moist paste of the aminophthalocyanine dyestuff of the formula

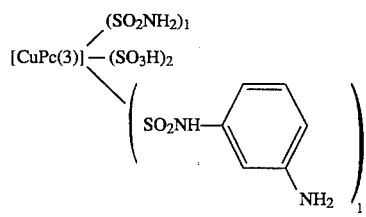

(prepared by the procedure given in Example 2 of EP-A 12,349) is stirred in 1 l of water, and the mixture is brought to a pH of 6.

An aqueous solution of 0.1 mol of the dichlorotriazine product of the formula

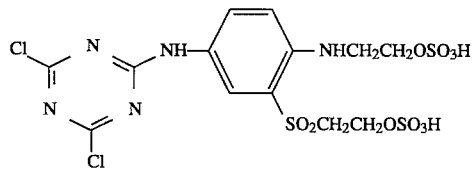

is added, and the mixture is heated to 45° C. while maintaining the pH between 5 and 6 by addition of sodium bicarbonate. After condensation is complete (the disappearance of the dichlorotriazine compound is monitored by HPLC), the dyestuff is salted out from the clear solution by addition of 10% by volume of common salt. The product is filtered off with suction, dried and milled to give a blue dyestuff powder which is readily soluble in water, giving a turquoise blue solution.

The dyestuff has the formula (average composition)

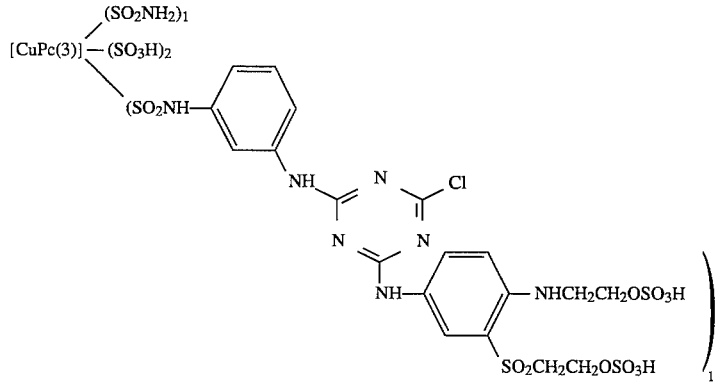

Strong turquoise blue dyeings (colour indicator number 16) are obtained on cotton by an application method customary for reactive dyestuffs.

The dichlorotriazine compound used in this example is obtained as follows. 0.1 mol of 4-N-(β-sulphatoethyl)amino- 3-(β-sulphatoethylsulphonyl)-aniline (prepared by the procedure of Example 1 of DE-OS (German Published Specification) 3,704,660) is dissolved in 1 l of ice water. 0.1 mol of cyanuric chloride is then added, and the mixture is stirred at 0° to 3° C. and pH 5 to 6, which is maintained by spreading sodium bicarbonate. Condensation is quickly finished.

Further dyestuffs producing turquoise blue dyeings on cotton are obtained repeating this example, using the same aminophthalocyanine compound but using an equivalent amount of the anilines (8b) listed below instead of 4-N-(β-sulphatoethyl)-amino-3-(β-sulphatoethylsulphonyl)aniline.

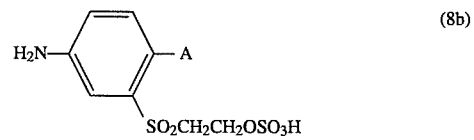

Example A

| | |
|---|---|
| 2 | amino |
| 3 | morpholino |
| 4 | ethylamino |
| 5 | methylamino |
| 6 | diethylamino |
| 7 | N-methyl-N-β-sulphatoethylamino |
| 8 | N-methyl-N-β-sulphoethylamino |
| 9 | N-β-(β'-sulphatoethoxy)-ethylamino |
| 10 | β-(β'-sulphatoethoxy)-ethoxy |
| 11 | β-ethoxy-ethylamino |
| 12 | carboxymethylamino |
| 13 | N-methyl-N-β-propylamino |
| 14 | v-sulphato-n-propylamino |
| 15 | β-sulphatoethylthio |
| 16 | β-carboxyethylamino |
| 17 | N-β-(4'-sulphophenyl)-ethylamino |
| 18 | N-β-(4'-(β'-sulphatoethylsulphonyl)-phenyl)-ethylamino |
| 19 | N-β-(β'-(β''-sulphatoethylsulphonyl)-ethoxy)-ethylamino |
| 20 | β-sulphatoethoxy |
| 21 | β-ethoxy-ethylamino |

-continued

| | |
|---|---|
| 22 | morpholino |
| 23 | di-isopropylamino |

-continued

| 24 | di-n-propylamino |
| 25 | isopropylamino |
| 26 | cyclohexylamino |

The examples 1 to 26 have a $\lambda_{max}$-value of 620 nm.

EXAMPLE 27

0.1 mol of water-moist paste of the aminophthalocyanine dyestuff of the formula

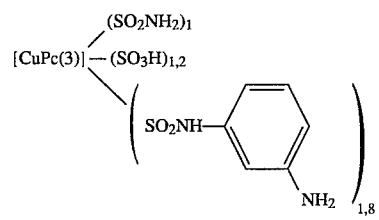

(prepared by the procedure of Example 2 of European Patent Specification 12,349 using twice the amount of 3-aminophenyloxamic acid) is stirred in 0.5 l of water under neutral conditions. A solution of 0.18 mol of the dichlorotriazine compound used in Example 1 is added, and the mixture is heated to 45° to 50° C. while maintaining the pH between 5.5 and 6 by addition of sodium bicarbonate. After condensation is complete, the dyestuff is salted out from the clear solution by addition of 15% by volume of common salt. The product is filtered off with suction, dried and milled to give a blue dyestuff powder which is readily soluble in water, giving a turquoise blue solution. The dyestuff has the following average composition.

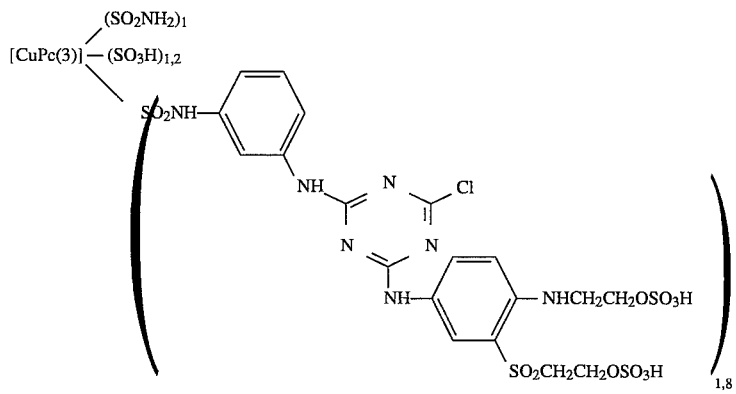

The dyestuff produces strong turquoise blue (colour indicator number 16 $\lambda_{max}$=616 nm) dyeings on cotton.

Further valuable dyestuffs which likewise produce turquoise blue dyeings on cotton are obtained by repeating this examples using the same aminophthalocyanine compound but using an equivalent amount of the anilines (8b) used in Examples 2 to 27 instead of 4-N-(β-sulphatoethyl)-3-(β-sulphatoethylsulphonyl)aniline.

EXAMPLE 28

0.1 mol of water-moist paste of the aminophthalocyanine dyestuff of the formula

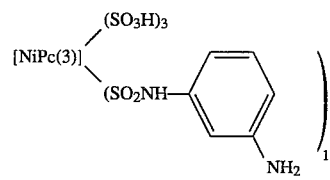

(prepared by the procedure of Example 1 of EP-A-12,349) is stirred in 1 l of water, and the mixture is brought to a pH of 6. A solution of 0.1 mol of the dichlorotriazine product of the formula

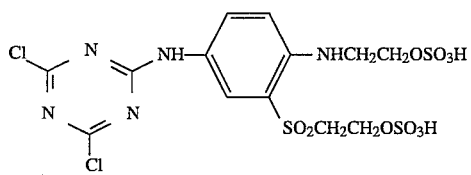

is added, and the mixture is heated to 45° C. while maintaining the pH between 5 and 6 by addition of sodium bicarbonate. After condensation is complete, the dyestuff is separated from the clear solution by addition of 15% by volume of common salt. The product is filtered off with suction, dried and milled to give a blue dyestuff powder which dissolves in water, giving a green solution.

The dyestuff has the formula (average composition)

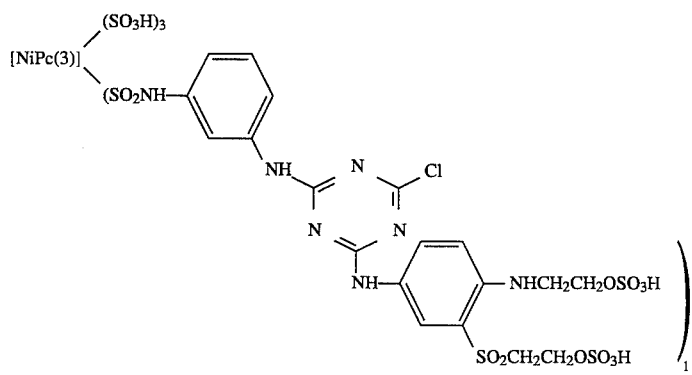

It dyes cotton in green hues having very good fastness properties (colour indicator number 17).

Further valuable dyestuffs which produce green dyes on cotton are obtained by repeating this example, using the same aminophthalocyanine compound but using an equivalent amount of the anilines (8a) used in Examples 2 to 26 instead of 4-N-(β-sulphatoethyl)-amino-3-β-sulphatoethylsulphonyl-aniline.

Example 1 is repeated, using the aminophthalocyanines listed below instead of the ones used in Example 1, 27 and 28 and using the anilines (8b) used in Examples 1 to 26, likewise to give dyestuffs having similarly good properties.

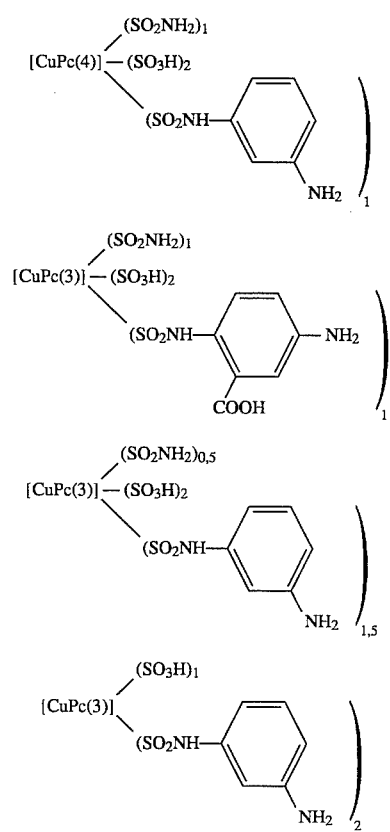

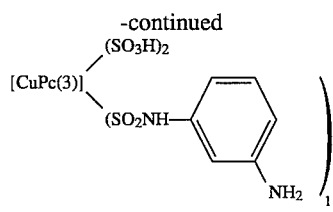

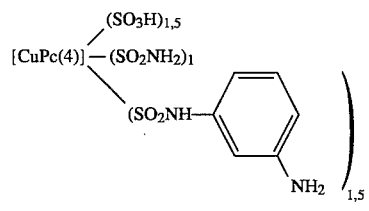

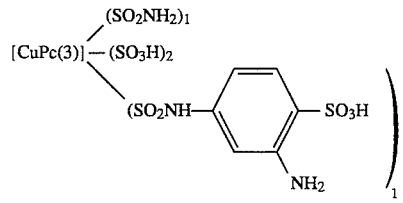

EXAMPLE 29

0.1 mol of 4-N-morpholino-3-β-sulphatoethylsulphonylaniline is added to 0.1 mol of the dichlorotriazinephthalocyanine dyestuff of the formula

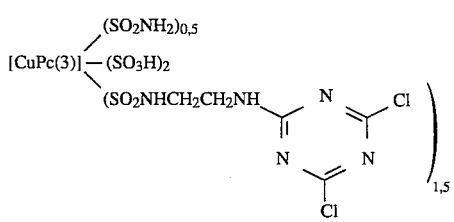

(prepared by the procedure of Example 1 of DE-OS (German Published Specification) 3,405,204), which are present as a neutral solution in about 1 l of water, and the mixture is heated at 45° to 50° C. for several hours. After condensation is complete, the dyestuff is salted out, filtered off with suction, dried and milled. The dyestuff is readily soluble in water, giving a turquoise blue solution, and produces turquoise blue dyeings on cotton having very good fastness properties. It has the following average composition.

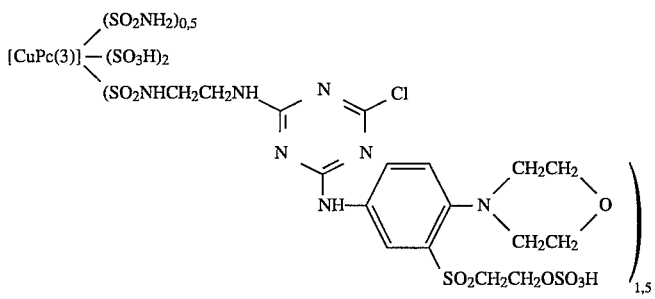

This example is repeated, but an equivalent amount of the anilines (8b) used in Examples 1 to 21 and 23 to 26 is used instead of 4-N-morpholino-3-β-sulphatoethylsulphonylaniline, likewise giving turquoise blue dyeings (colour indicator number 16 $\lambda_{max}$=614 nm).

Using the phthalocyanine-dichlorotriazine dyestuffs listed below instead of the one used in Example 29 and using the anilines (8b) used in Examples 1 to 21 and 23 to 26 gives dyestuffs having similar properties.

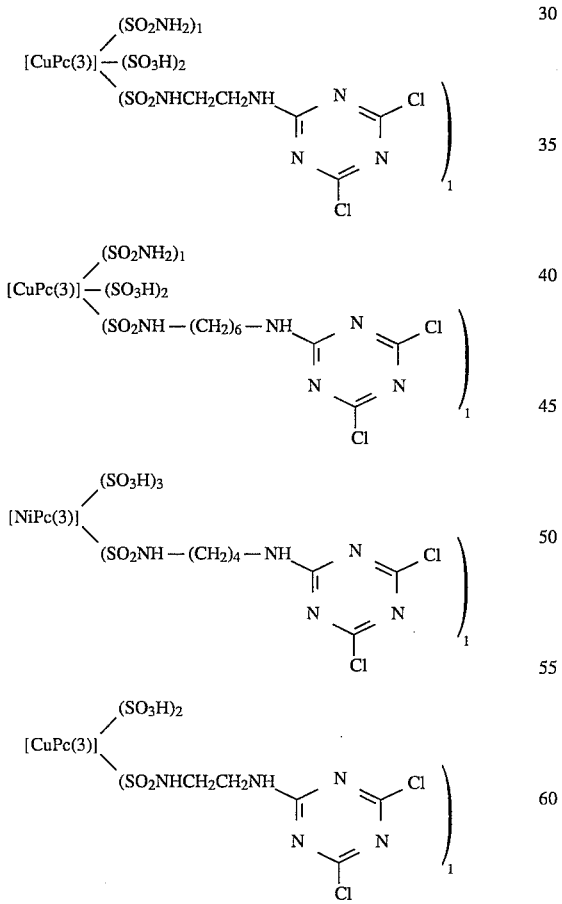

EXAMPLE 30

0.1 mol of the aminophthalocyanine dyestuff of average composition

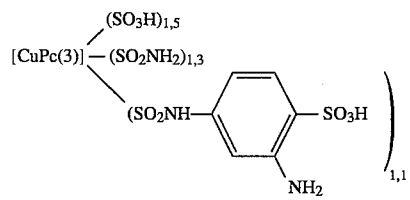

(prepared by the procedure of Example 1 of DE-OS (German Published Specification) 1,569,823) is dissolved in 1 l of ice water. 15 g of trifluorotriazine are then added dropwise while maintaining a pH of 5.5 to 6.5 by simultaneous addition of sodium bicarbonate. After condensation is complete, 0.11 mol of 4-N-(β-sulphatoethyl)-amino-3-β-sulphatoethylsulphonylaniline is added, and condensation is carried out at a pH of 5.5 to 6.5 and 5° to 10° C. while maintaining the pH by spreading sodiumbicarbonate. After reaction is complete, the dyestuff of the formula

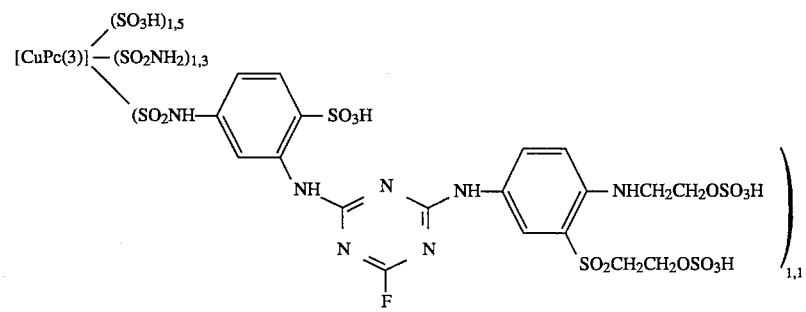

is salted out, filtered off with suction, dried and milled. The resulting dyestuff powder is readily soluble in water, giving a blue solution, and produces turquoise blue dyeings ($\lambda_{max}=$ 618 nm) on cotton Further dyestuffs producing turquoise blue dyeings on cotton are obtained by repeating this example, using the same aminophthalocyanine compound but using an equivalent amount of the anilines (8b) mentioned in Examples 2 to 26 instead of 4-N-(β-sulphatoethyl)-amino-3-(β-sulphatoethylsulphonyl)-aniline.

What is claimed is:

1. A phthalocyanine reactive dyestuff which, in the form of the free acid, has the formula

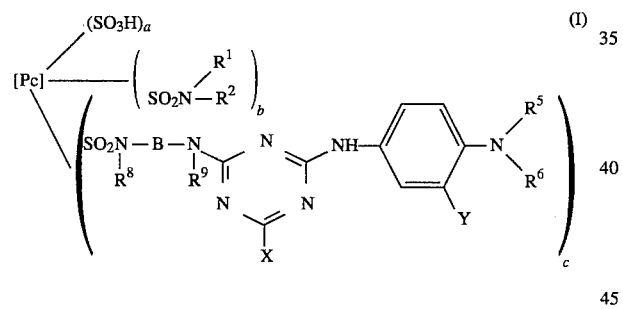

in which

Pc denotes a metal-free or metal containing phthalocyanine, $R^1$ and $R^2$ independently of one another, represent hydrogen, or $C_1$–$C_6$-alkyl unsubstituted or substituted by $OCH_3$, OH, COOH, $SO_3H$ or phenyl, B denotes a radical selected from the group consisting of

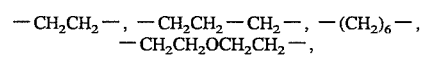
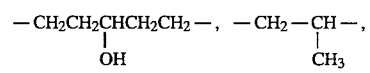
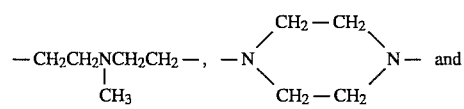

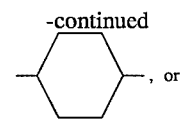, or an araliphatic radical of the formula

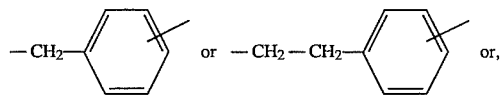

an aromatic radical selected from the group consisting of

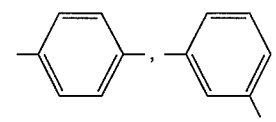

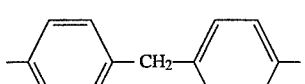

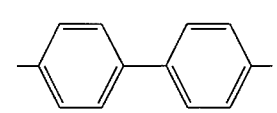

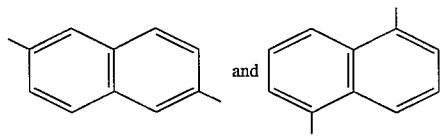

wherein the phenylene or naphthylene rings are unsubstituted or substituted by $C_1$–$C_4$-alkyl, $C_1$–$C_4$-alkoxy, halogen or acid groups, X represents chlorine or fluorine, Y represents $SO_2CH=CH_2$, $SO_2CH_2CH_2OSO_3H$, $SO_2CH_2CH_2Cl$, $SO_2CH_2CH_2S_2O_3H$, $SO_2CH_2CH_2OPO_3H_2$, or $SO_2CH_2CH_2OOCCH_3$, $R^5$ represents hydrogen, $C_1$–$C_6$-alkyl which is optionally interrupted by O, S, $SO_2$, $NR^7CO$ or $NR^7$, $NR^7SO_2$, a 5 or 6 membered cycloaliphatic radical, or a radical of the formula

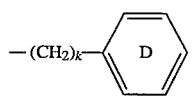

in which k is 1 to 4 and the ring D is unsubstituted or is substituted by Cl, $NO_2$, COOH, $SO_3H$, $CH_3$, $OCH_3$, $SO_2CH_2CH_2OSO_3H$, $SO_2CH=CH_2$ or $CH_2SO_2CH_2CH_2OSO_3H$, $R^6$ has the meaning given for $R^5$ or represents a phenyl or naphthyl radical which is optionally substituted by $OCH_3$, $OC_2H_5$, $OCH_2CH_2OH$, $CH_3$, $C_2H_5$, $-CH(CH_3)_2$, F, Cl, Br, COOH, $SO_3H$, $NO_2$, $SO_2CH_2CH_2OSO_3H$, $CH_2SO_2CH_2CH_2OSO_3H$, $CH_2SO_2CH=CH_2$ or $SO_2CH=CH_2$, or the radicals $R^5$ and $R^6$, together with the nitrogen atom, form a ring optionally containing as an additional ring hetero moiety O, NH, $NCH_3$, $NCOCH_3$, $N-C_2H_4SO_2CH_2=CH$, S, SO or $SO_2$, $R^7$ represents hydrogen or $C_1$–$C_4$-alkyl; which is optionally substituted by OH, Cl, F, COOH, $SO_3H$, $CH_2$, $OSO_3H$, $SO_2CH=CH_2$, CN, $OCH_3$, $SO_2CH_2CH_2Cl$ or $SO_2CH_2CH_2OSO_3H$, a is 0 to 3, b is 0 to 3, c is 1 to 3, a+b+c being at most 4, and $R^8$ and $R^9$ independently of one another, represent hydrogen or $C_1$–$C_6$-alkyl which is unsubstituted or substituted by $OCH_3$, OH, COOH, $SO_3H$ or phenyl.

2. A phthalocyanine reactive dyestuff according to claim 1, in which

Pc represents the radical of a copper phthalocyanine, nickel phthalocyanine or cobalt phthalocyanine.

3. A phthalocyanine reactive dyestuff according to claim 1, wherein

Y represents $-SO_2CH=CH_2$ or $SO_2CH_2CH_2OSO_3H$.

4. A phthalocyanine reactive dyestuff according to claim 1, in which

B represents $-CH_2CH_2-$, $-CH_2CH_2-CH_2-$, $-(CH_2)_6-$, $-CH_2CH_2OCH_2CH_2-$, $-CH_2CH_2CHCH_2CH_2-$,
                                              |
                                              OH $-CH_2-CH-$, $-CH_2CH_2NCH_2CH_2-$,
       |              |
       $CH_3$          $CH_3$

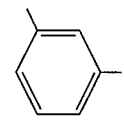 or 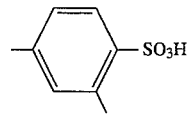,

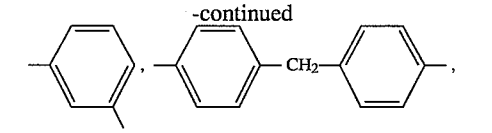

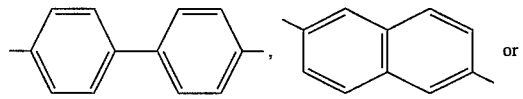

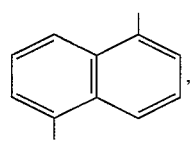

5. A phthalocyanine reactive dyestuff according to claim 1, wherein B represents phenylene.

6. A phthalocyanine reactive dyestuff according to claim 1, in which $R^1$, $R^2$, $R^8$ and $R^9$ denote hydrogen.

7. A phthalocyanine reactive dyestuff according to claim 1, wherein

B represents

[structure: methyl-substituted phenylene]

and

X represents Cl.

8. A phthalocyanine reactive dyestuff according to claim 1, in which

B represents

[structure: $SO_3H$-substituted phenylene]

and

X represents F.

9. A phthalocyanine reactive dyestuff according to claim 1, wherein $R^5$ denotes $CH_2CH_2CH_2SO_2CH_2CH_2OSO_3H$.

10. In the dyeing or printing of cotton with a phthalocyanine reactive dyestuff, the improvement which comprises employing as said dyestuff a phthalocyanine reactive dyestuff according to claim 1.

* * * * *

UNITED STATES PATENT AND TRADEMARK OFFICE
CERTIFICATE OF CORRECTION

PATENT NO. : 5,453,501
DATED : September 26, 1995
INVENTOR(S) : Jager, Horst

It is certified that error appears in the above-indentified patent and that said Letters Patent is hereby corrected as shown below:

Col. 19 last line    Delete "  "

Col. 20, lines 1-15    Delete " 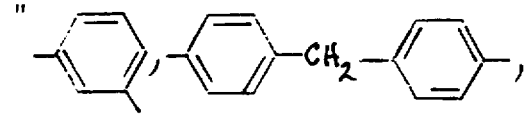

 "

Signed and Sealed this

Twenty-third Day of January, 1996

Attest:

BRUCE LEHMAN

Attesting Officer    Commissioner of Patents and Trademarks